United States Patent [19]

Martin

[11] 4,394,478
[45] Jul. 19, 1983

[54] OXIDIZED CARBONACEOUS MATERIALS AND VULCANIZED AND VULCANIZABLE RUBBER COMPOSITIONS REINFORCED WITH SUCH CARBONACEOUS MATERIALS

[75] Inventor: Jon W. Martin, Los Alamitos, Calif.

[73] Assignee: TRW Inc., Redondo Beach, Calif.

[21] Appl. No.: 278,921

[22] Filed: Jun. 29, 1981

[51] Int. Cl.$^3$ .......................... C08K 3/18; C08K 3/10
[52] U.S. Cl. ..................................... 524/424; 524/176
[58] Field of Search ............................... 524/176, 424

[56] References Cited

U.S. PATENT DOCUMENTS

| | | | |
|---|---|---|---|
| 3,278,441 | 10/1966 | Manuel et al. | 524/424 |
| 3,763,085 | 10/1973 | McFadgen | 524/424 |
| 3,826,776 | 7/1974 | Wright | 524/424 |
| 4,098,734 | 7/1978 | Lee | 524/424 |

*Primary Examiner*—John C. Bleutge
*Assistant Examiner*—Herbert J. Lilling
*Attorney, Agent, or Firm*—Robert W. Keller; John W. Wiedemann; Patrick F. Bright

[57] ABSTRACT

Oxidized carbonaceous materials suitable for reinforcing such diene rubbers as styrene-butadiene rubber and natural rubber include carbon, oxidized iron dispersed in, intimately associated with and at least partially bonded to the carbon, and hydrogen.

3 Claims, No Drawings

OXIDIZED CARBONACEOUS MATERIALS AND VULCANIZED AND VULCANIZABLE RUBBER COMPOSITIONS REINFORCED WITH SUCH CARBONACEOUS MATERIALS

This invention relates to new oxidized carbonaceous materials that include carbon, iron dispersed in, intimately associated with and at least partially bonded to the carbon, oxygen and hydrogen; to new compositions comprising a mixture of sulfur-curable, rubbery polymers and such oxidized carbonaceous materials; and to vulcanized and vulcanizable compositions that include such mixtures.

The new carbonaceous materials include carbon in an amount in the range of about 80% to about 99% by weight, preferably about 90% to about 94% by weight; oxidized iron dispersed in, intimately associated with and at least partially bonded to the carbon in an amount in the range of about 1% to about 15% by weight, preferably about 3% to about 9% by weight; and hydrogen, in an amount in the range of about 0.1% to about 1.5% by weight, preferably about 0.5% to about 0.8% by weight.

We make our new carbonaceous materials by depositing carbon from a carbon monoxide/hydrogen gas mixture on an iron-based initiator at a temperature in the range of about 300° C. to about 700° C., and at a pressure in the range of about one to about 100 atmospheres or more. Copending U.S. patent application Ser. No. 99,789, filed Dec. 3, 1979, in the U.S. Patent and Trademark Office, and entitled, "Novel Carbonaceous Material and Process for Producing a High BTU Gas from this Material," describes these processes fully. By this reference, we incorporate into this specification the entire disclosure of that specification.

Because this carbon deposition reaction takes place in a chemically reducing environment, rich in carbon monoxide and hydrogen, the carbonaceous material itself is produced in a reduced form. The iron in this reduced carbonaceous material is dispersed in, intimately associated with and at least partially bonded to the carbon in the material. X-ray analysis of this material shows diffraction patterns for $\alpha$-iron (2.03 dA), $Fe_3C$ (2.08 dA), or both, but not for such oxidized forms of iron as FeO (2.15 dA), $Fe_2O_3$ (2.69 dA), FeO(OH) (6.26 dA), and $Fe_3O_4$ (2.53 dA).

Oxidation of the reduced iron in these carbonaceous materials produces a new oxidized carbonaceous material with the iron dispersed in, intimately associated with and at least partially bonded to the carbon in the oxidized material. This material is surprisingly effective in reinforcing sulfur-curable rubbery polymers. Such rubbery polymers typically include at least about two mole percent of residual unsaturation.

Oxidation of the iron in our carbonaceous materials can be effected in several ways. For example, the carbon can be heated in air, steam or hot water at temperatures in the range of about 200° F. to about 400° F. for a time in the range of about 0.5 to about 24 hours Alternatively, we can oxidize this iron chemically, say with dilute nitric acid. These processes oxidize the iron to such oxide forms as FeO, $Fe_2O_3$, FeO(OH), or $Fe_3O_4$.

In one case, during oxidation, we convert the carbonaceous materials to agglomerates, called pellets in the carbon black industry. To pelletize our materials, we mix them with water in about a 1:1 weight ratio, and roll this mixture in a rotating cylinder, rotating tilting dish, pin mill or pug mill for a time in the range of about one minute to about 60 minutes, or until pellets of desired sizes form. Desirable pellet sizes are in the range of about 8 mesh to about 35 mesh. After forming these pellets, we dry them at a temperature in the range of about 80° C. to about 200° C. for a time in the range of about 0.1 to about two hours. Prepared in this manner, the carbonaceous materials contain oxidized iron, substantially all of which is FeO and $Fe_2O_3$.

Our new oxidized carbonaceous materials provide unexpectedly good reinforcement for vulcanizable and vulcanized diene rubber compositions, such as those made from styrene-butadiene rubber (SBR), polyisoprene rubber, natural rubber (NR), polybutadiene rubber (BR), Guayule, and blends thereof. In such compositions, our new carbonaceous materials can constitute an amount in the range of about 5% to about 60% by weight.

We can incorporate our new carbonaceous material in such diene-containing rubber polymers by conventional techniques. Such techniques include Banbury mixing, two-roll mill mixing, solvent or latex master batching, or dry master batching. Our new rubber compositions may, but need not always, include compounding oil. Such oils can constitute an amount of up to about 25% of these compositions.

Carbon black fillers are commonly added to rubber compositions to increase their modulus, tensile strength and hardness upon vulcanization. ASTM Tests D412 and D2240 show that conventional carbon blacks, such as semi-reinforcing furnace (SRF) of Type ASTM N-762, perform such functions. They also permit rubber compositions containing them to flow for a time when the compositions are heated to vulcanization temperatures. Flow times and vulcanization properties are often measured with an oscillating disc rheometer (ODR) of the kind available from the Monsanto Company. When an unvulcanized, vulcanizable rubber composition is heated to vulcanization temperature in the ODR according to the procedure outlined in ASTM Test D1646, which calls for monitoring the torque required to turn the disc in a 3° arc while in contact with the vulcanizing rubber composition, the device produces a curve which traces the increasing torque that the disc encounters from the rubber as vulcanization progresses. The time for torque to increase five units, denoted $T_5$, is called the scorch period. This scorch period is designated as the point at which vulcanization begins. The time required for the vulcanizing rubber composition in the rheometer to reach about 90% of its optimum cure, denoted $T_{90}$, is designated the optimum cure. Maximum viscosity of the vulcanized rubber composition is directly related to its modulus and is denoted $\gamma_{max}$.

Our new oxidized carbonaceous materials increase modulus, tensile strength and hardness of vulcanized diene-containing rubber polymers reinforced with these carbonaceous materials to nearly the same extent as semi-reinforcing furnace (SRF) carbon black does. However, our carbonaceous materials produce a shorter scorch period in diene-containing, rubbery polymers reinforced with them than SRF does in the same rubbery polymers. Oxidizing the iron in our carbonaceous materials lengthens the scorch period for diene-containing, rubbery polymers containing them. By contrast, oxidation of conventional, petroleum-derived carbon black such as SRF shortens the scorch period of diene-containing, rubbery polymers reinforced with them. Moreover, oxidation of conventional carbon blacks reduces their reinforcing properties. Indeed, highly oxidized conventional carbon blacks are not good reinforcing agents for diene-containing, rubbery polymers. By contrast, our oxidized carbonaceous materials are more highly reinforcing than the unoxidized forms of the same carbonaceous materials.

The following examples illustrate the preparation and properties of our new carbonaceous materials, methods for incorporating them in diene-containing, rubbery polymers and the effects on the properties of vulcanizable and vulcanized rubber compositions reinforced with them.

EXAMPLE 1

Following the methods disclosed in U.S. patent application Ser. No. 99,789, identified above more fully, we prepared carbonaceous material comprising about 95% carbon, about 3.4% iron in the iron carbide form and about 0.6% hydrogen. We heated this carbonaceous material for 16 hours at about 300° F. in air to convert the iron carbide in the material to oxidized iron.

We then prepared two vulcanizable, SBR-based compositions, one containing 50 parts of the unoxidized carbonaceous material (sample 1), the other containing 50 parts of the oxidized carbonaceous material (sample 2).

We prepared both samples in a Banbury mixer operated at 77 revolutions per minute over a seven-minute time period, using a water coolant on both the rotor and shell of the mixture. The mixing regime was as follows in both cases: At zero time, we placed the polymer in the Banbury mixer. At 0.5 minutes, we added the other ingredients except for the carbonaceous material. At one minute, we added half of the carbonaceous material, and at two minutes, we added the other half of the carbonaceous material. At five minutes, we swept the mixer for undispersed material. At seven minutes, we removed the samples from the Banbury mixer. We then added curatives on a two-roll mill.

We cured one portion from each sample in an hydraulic press for 50 minutes at 293° F., and tested these samples for tensile strength, elongation at break and Shore A hardness. These results appear in Table I below.

We curved a second portion of each sample in an oscillating disc rheometer at 320° F., and obtained the results set forth in Table I. These data show that the sample reinforced with oxidized carbonaceous material had a 12% longer scorch period than the sample reinforced with unoxidized carbonaceous material.

TABLE I

| Component | 1 | 2 |
|---|---|---|
| SBR 1500 | 100 | 100 |
| Unoxidized Carbonaceous Material | 50 | — |
| Oxidized Carbonaceous Material | — | 50 |
| Zinc Oxide | 3 | 3 |
| Stearic Acid | 1 | 1 |
| Sulfur | 1.75 | 1.75 |
| TBBTS Accelerator[1] | 1 | 1 |
| | 156.75 | 156.75 |
| Properties | | |
| Tensile Strength, psi[2] | 1.105 | 1.527 |
| Elongation at break, percent[2] | 320 | 360 |
| Shore A Hardness[3] | 48 | 55 |
| $T_5$ Minutes[4] | 2.5 | 2.8 |
| $T_{90}$ Minutes[4] | 9.9 | 10 |
| $\gamma$ max[4] | 68.5 | 77 |

[1] N—t-butyl-2-benzothiazylsulfenamide
[2] Results from procedures described in ASTM Test D412
[3] Results from procedures described in ASTM Test D2240.
[4] Results from procedures described in ASTM Test D1646, run at 320° F. and a 3° arc.

EXAMPLE 2

We pelletized a portion of the unoxidized carbonaceous material whose preparation is set forth in Example 1 above on a Ferro-Tech 16-inch diameter disc pelletizer using a water-to-carbonaceous material weight ratio of about 1:1. We dried the pellets for two hours at 150° C. and analyzed them for oxygen content. We found that the pelletizing process converted substantially all the iron in the carbonaceous material to ferric oxide ($Fe_3O_4$).

We then prepared two SBR-based compositions in a Banbury mixer following the procedure set forth in Example 1 above. The first of these compositions, denoted sample 3 in Table II below, included 50 parts of the unoxidized carbonaceous material. The other sample, denoted sample 4 in Table II below, contain 50 parts of the pelletized, oxidized carbonaceous material.

We cured a portion of each of samples 3 and 4 in an hydraulic press for 50 minutes at 290° F., and tested these samples for tensile strength, elongation at break and Shore A hardness. The results obtained appear in Table II below.

We cured separate portions of each sample in an oscillating disc rheometer at 320° F. using a 3° arc for the disc.

TABLE II

| Component | 3 | 4 |
|---|---|---|
| SBR 1500 | 100 | 100 |
| Unoxidized Carbonaceous Material | 50 | — |
| Oxidized, Pelletized Carbonaceous Material | — | 50 |
| Zinc Oxide | 3 | 3 |
| Stearic Acid | 1 | 1 |
| Sulfur | 0.9 | 0.9 |
| TBBTS Accelerator[1] | 1 | 1 |
| Phthalimide Retarder[5] | 0.4 | 0.4 |
| | 156.3 | 156.3 |
| Properties | | |
| Tensile Strength, psi[2] | 1.478 | 1.850 |
| Elongation at Break, Percent[2] | 475 | 595 |
| Shore A Hardness[3] | 55 | 57 |
| $T_5$, Minutes[4] | 3.0 | 5.3 |
| $T_{90}$, Minutes[4] | 8.5 | 8.8 |
| $\gamma$max[4] | 50 | 49 |
| Die B Tear, pounds/linear inch[6] | 223 | 249 |

[1] See footnote 1 in Table I.
[2] See footnote 2 in Table I.
[3] See footnote 3 in Table I.
[4] See footnote 4 in Table I.
[5] N—(cyclohexylthio)phthalimide.
[6] Results from procedures described in ASTM Test D 624.

The results obtained also appear in Table II below, and show substantial lengthening of the scorch period, and a significant improvement in tensile strength and elongation for the oxidized, pelletized materials over the results obtained with the unoxidized carbonaceous material.

EXAMPLE 3

We prepared two additional samples, samples 5 and 6, containing the same components as samples 3 and 4 except that we added five parts of compounding oil per 100 parts of SBR to each composition. Samples 5 and 6 were prepared in a Banbury mixer using the mixing regime set forth in Example 1.

We vulcanized a portion of each of samples 5 and 6 in an hydraulic press at 293° F. for 50 minutes, and tested each sample for tensile strength, elongation at break and Shore A hardness. We vulcanized separate portions of samples 5 and 6 in the oscillating disc rheometer to determine the scorch period for each. The resulting data appear in Table III below. They show that the oiled, oxidized carbonaceous material improved the tensile strength of the vulcanized SBR sample 6 containing this material, and lengthened its scorch period, as compared to the vulcanized SBR sample 5 containing unoxidized, unoiled carbonaceous material.

TABLE III

|  | 5 | 6 |
|---|---|---|
| Tensile Strength, psi[2] | 1,000 | 1,468 |
| Elongation at Break, Percent[2] | 510 | 480 |
| Shore A Hardness[3] | 57 | 55 |
| $T_5$, Minutes[4] | 4.5 | 7.2 |

[2]See footnote 2 in Table I.
[3]See footnote 3 in Table I.
[4]See footnote 4 in Table I.

Following the method described in Example 1 above, we prepared an unoxidized, iron-based carbonaceous material comprising about 95% carbon, about 4.2% iron, and about 0.8% hydrogen. We oxidized this carbonaceous material in air for four hours at 400° F., converting substantially all the iron to $Fe_2O_3$.

We then prepared two separate SBR-based vulcanizable rubber samples, one comprising 54 parts of the unoxidized carbonaceous material described above, and the other 54 parts of the oxidized carbonaceous material described above. These two compositions, namely samples 7 and 8, are set forth in detail below in Table IV.

We vulcanized portions of sample 7 and sample 8 in an hydraulic press for 50 minutes at 293° F., and tested these samples for tensile strength, elongation at break and Shore A hardness. The results obtained are also set forth in Table IV below. Second portions of samples 7 and 8 were vulcanized in an oscillating disc rheometer at 320° F. using a 3° arc. The results obtained are also set forth in Table IV.

The data in Table IV show that oxidation of the carbonaceous material improves the tensile strength and elongation at break of SBR reinforced with this material, lengthens its scorch period, but does not decrease the maximum torque obtained in the ODR tests.

TABLE IV

| Component | 7 | 8 |
|---|---|---|
| SBR 1500 | 100 | 100 |
| Naphthenic Oil | 7.5 | 7.5 |
| Unoxidized Carbonaceous Materials | 54 | — |
| Oxidized Carbonaceous Materials | — | 54 |
| Zinc Oxide | 2 | 2 |
| Stearic Acid | 1 | 1 |
| Sulfur | 1.3 | 1.3 |
| TBBTS Accelerator[1] | 1 | 1 |
| Phthalimide Retarder[5] | 0.43 | 0.43 |
|  | 167.23 | 167.23 |
| Tensile Strength, psi[2] | 1.043 | 1.195 |
| Elongation at Break, percent[2] | 360 | 440 |
| Shore A Hardness[3] | 58 | 55 |
| $T_5$, Minutes[4] | 3.5 | 3.9 |
| $T_{90}$, Minutes[4] | 10 | 10.9 |
| $\gamma$max[4] | 57 | 57 |

[1]See footnote 1 in Table I.
[2]See footnote 2 in Table I.
[3]See footnote 3 in Table I.
[4]See footnote 4 in Table I.
[5]See footnote 5 in Table II.

EXAMPLE 5

We subjected two portions of the unoxidized carbonaceous material described in Example 1 above to two different steaming processes to oxidize them. We oxidized one portion of the unoxidized carbonaceous material with steam at a pressure of 90 to 140 psig for 4.5 hours, and the second portion of the carbonaceous material at 500 psig with steam for 4.5 hours. X-ray diffraction analysis of the oxidized carbonaceous material formed at 90 to 140 psig shows that the iron was converted to $Fe_3O_4$. The carbonaceous material steamed at higher pressure contained both $Fe_3O_4$ and $Fe_2O_3$.

We then prepared three separate reinforced SBR-based vulcanizable rubber samples, one containing the unoxidized carbonaceous material, the second containing the carbonaceous material oxidized at lower pressure, and the third containing the carbonaceous material oxidized at higher pressure. These three samples, denoted, 9, 10 and 11, are described in detail in Table V below.

We vulcanized portions of each of these samples at 293° F. for 50 minutes, and tested each vulcanized sample for tensile strength, elongation at break and Shore A hardness. The results obtained are set forth in Table V.

Finally, we vulcanized a portion of each of these three samples in the ODR at 320° F. using a 3° arc. The results obtained are set forth in Table V.

As before, oxidation of the carbonaceous material lengthened the scorch period, and increased tensile strength, elongation at break and Shore A hardness of vulcanized SBR compositions containing them.

TABLE V

| Component | 9 | 10 | 11 |
|---|---|---|---|
| SBR 1500 | 100 | 100 | 100 |
| Unoxidized Carbonaceous Materials | 50 | — | — |
| Oxidized Carbonaceous Materials (Lower Pressure) | — | 50 | — |
| Oxidized Carbonaceous Materials (Higher Pressure) | — | — | 50 |
| Zinc Oxide | 3 | 3 | 3 |
| Stearic Acid | 1 | 1 | 1 |
| Sulfur | 0.9 | 0.9 | 0.9 |
| TBBTS Accelerator[1] | 1 | 1 | 1 |
| Phthalimide Retarder[5] | 0.4 | 0.4 | 0.4 |
|  | 156.3 | 156.3 | 156.3 |
| Properties |  |  |  |
| Tensile Strength, psi[2] | 1.478 | 1.524 | 1.632 |
| Elongation at Break, Percent[2] | 475 | 480 | 430 |
| Shore A Hardness[3] | 55 | 58 | 60 |
| $T_5$, Minutes[4] | 3 | 4 | 4.3 |
| $T_{90}$, Minutes[4] | 8.5 | 13.2 | 16 |

TABLE V-continued

| | | | |
|---|---|---|---|
| $\gamma_{max}^4$ | 50 | 54 | 56 |

[1] See footnote 1 in Table I.
[2] See footnote 2 in Table I.
See footnote 3 in Table I.
[4] See footnote 4 in Table I.
[5] See footnote 5 in Table II.

EXAMPLE 6

Following the methods set forth in Example 1 above, we prepared an unoxidized carbonaceous material comprising about 93.7% carbon, about 5.7% iron and about 0.6% hydrogen. We oxidized this carbonaceous material in air for four hours at 400° F., converting substantially all the iron to $Fe_2O_3$.

We then prepared two rubber samples, each containing both natural rubber and SBR. We reinforced one of the samples, denoted 12, with the unoxidized carbonaceous material, and the other, denoted 13, with the oxidized carbonaceous material. The complete recipes for these two samples appear in Table VI.

We vulcanized a portion of each sample at 307° F. for 20 minutes in an hydraulic press, and tested the vulcanized samples for tensile strength, elongation at break and Shore A hardness. The results obtained are in Table VI.

We vulcanized a second portion of each composition in the ODR at 300° F. using a 3° arc for the disc. The results obtained are also in Table VI.

The results in Table VI show that oxidation of the carbonaceous material produces a longer scorch period in a natural rubber/SBR composition reinforced with such material and better tensile strength, elongation at break and Shore A hardness, than in such rubber compositions reinforced with unoxidized carbonaceous material.

TABLE VI

| Component | 12 | 13 |
|---|---|---|
| Natural Rubber No. 1 RSS | 30 | 30 |
| SBR 1708 | 96.3 | 96.3 |
| Unoxidized Carbonaceous Material | 70 | — |
| Oxidized Carbonaceous Material | — | 70 |
| Rosin Oil | 10 | 10 |
| Zinc Oxide | 4 | 4 |
| Stearic Acid | 1 | 1 |
| Polybutylated Bisphenol A (Antioxidant) | 1 | 1 |
| N—Cylcohexyl-2-Benzo-Thiazolsulfenamide-Accelerator | 1.0 | 1.0 |
| Tetramethylthiuram Monosulfide-Accelerator | 0.2 | 0.2 |
| Sulfur | 2.3 | 2.0 |
| | 215.8 | 215.5 |
| Properties | | |
| Tensile Strength, psi[2] | 1.260 | 1.490 |
| Elongation at break, Percent[2] | 340 | 350 |
| Shore A Hardness[3] | 59 | 63 |
| $T_5$, Minutes[4] | 3.8 | 4.7 |
| $T_{90}$, Minutes[4] | 7.2 | 10.1 |

TABLE VI-continued

| | | |
|---|---|---|
| $\gamma_{max}^4$ | 61.2 | 63.3 |

[2] See footnote 2 in Table I.
[3] See footnote 3 in Table I.
[4] See footnote 4 in Table I.

EXAMPLE 7

We compared certain properties of an unpelletized, unoxidized carbonaceous material comprising about 94% carbon, about 0.7% hydrogen and about 5.3% iron to the steam-oxidized, pelletized form of the same carbonaceous material. As the data in Table VII show, these two forms had substantially the same values for these properties. And these are the properties used to determine whether or not a carbonaceous material is suitable for reinforcing diene rubber. Accordingly, the surprisingly better-reinforcing properties obtained using our oxidized carbonaceous materials must be attributed to the oxidized iron in our materials.

TABLE VII

| | Unpelletized Carbonaceous Materials | Pelletized Carbonaceous Materials |
|---|---|---|
| Iodine Number, mg/g | 234 | 232 |
| Tinting Strength, % IRB No. 4 | 59.3 | 60 |
| Dibutyl Phthalate Absorption, cc/100g | 93 | 85 |
| Effective Specific Gravity | 2.03 | 2.04 |
| Volatile Content, Percent by Weight | 2.8 | 2.5 |
| Ash Content, Percent by Weight | 4.88 | 4.96 |
| 325 Mesh Grit, Percent by Weight | 0.007 | 0.005 |

What is claimed is:

1. A composition comprising a major amount of diene rubber and a minor amount of oxidized carbonaceous material comprising carbon in an amount of about 80% to about 99%; oxidized iron dispersed in, intimately associated with and at least partially bonded to the carbon in an amount of about 1% to about 15%; and hydrogen in an amount of about 0.1% to about 1.5% by weight.

2. The composition of claim 1 wherein said diene rubber is styrene-butadiene rubber, said styrene-butadiene rubber comprising an amount of about 90% to about 45% by weight of the composition and the carbonaceous material comprising an amount from about 5% to about 40% by weight of said composition.

3. The composition of claim 1 wherein said diene rubber is selected from the group consisting of styrene-butadiene rubber, natural rubber amd mixtures thereof, said rubber comprising an amount of about 90% to about 45% by weight of said composition and the carbonaceous material comprising an amount of about 5% to about 40% by weight of said composition.

* * * * *

UNITED STATES PATENT AND TRADEMARK OFFICE
CERTIFICATE OF CORRECTION

PATENT NO. : 4,394,478

DATED : July 19, 1983

INVENTOR(S) : Jon W. Martin

It is certified that error appears in the above-identified patent and that said Letters Patent is hereby corrected as shown below:

Column 1, line 60 after "hours" there should be a period and two spaces.

Column 3, line 65 in Table 1 "1.105 and 1.527" should be deleted and --1,105 and 1,527-- substituted therefor.

Column 4, line 50 in Table II "1.478 and 1.850" should be deleted and --1,478 and 1,850-- substituted therefor.

Column 5, line 20 "unoiled" should be deleted and --oiled-- substituted therefor.

Column 6, line 4 in Table IV "1.403 and 1.195" should be deleted and --1,403 and 1,195-- substituted therefor.

line 64 in Table V "1.478, 1.524 and 1.632" should be deleted and --1,478, 1,524 and 1,632-- substituted therefor.

Column 7, line 58 in Table VI "1.260 and 1.490" should be deleted and --1,260 and 1,490--substituted therefor.

UNITED STATES PATENT AND TRADEMARK OFFICE
CERTIFICATE OF CORRECTION

PATENT NO. : 4,394,478

DATED : July 19, 1983

INVENTOR(S) : Jon W. Martin

It is certified that error appears in the above-identified patent and that said Letters Patent is hereby corrected as shown below:

Column 8, line 39 "clained" should be deleted and --claimed-- substituted therefor.

Attorney shown should be --John T. Wiedemann-- instead of "John W. Wiedemann."

Signed and Sealed this

Sixth Day of December 1983

[SEAL]

Attest:

GERALD J. MOSSINGHOFF

Attesting Officer

Commissioner of Patents and Trademarks